United States Patent
Plantan et al.

(10) Patent No.: US 6,238,132 B1
(45) Date of Patent: May 29, 2001

(54) PUSH ROD AND PLATE ASSEMBLY FOR BRAKE ACTUATORS AND METHOD OF FORMING SAME

(75) Inventors: Ronald S. Plantan, Charlotte; Thomas O. Schultz, Davidson, both of NC (US)

(73) Assignee: Indian Head Industries, Inc., Charlotte, NC (US)

( * ) Notice: Subject to any disclaimer, the term of this patent is extended or adjusted under 35 U.S.C. 154(b) by 0 days.

(21) Appl. No.: 09/379,770

(22) Filed: Aug. 24, 1999

(51) Int. Cl.$^7$ .................................................. F01B 7/00
(52) U.S. Cl. .................. 403/343; 403/230; 403/282; 411/166; 411/114; 92/100
(58) Field of Search ............................. 92/63, 100, 101, 92/92; 403/230, 236, 282, 408.1, 343; 411/424, 411, 166, 114

(56) References Cited

U.S. PATENT DOCUMENTS

| | | | | |
|---|---|---|---|---|
| 628,297 | * | 7/1899 | Barr | 411/166 |
| 1,960,734 | * | 5/1934 | Fassinger | 411/424 |
| 4,854,114 | * | 8/1989 | Speck | 411/424 X |
| 5,067,391 | * | 11/1991 | Choinski et al. | 92/63 X |
| 5,205,205 | * | 4/1993 | Choinski et al. | 92/63 |
| 5,263,403 | * | 11/1993 | Choinski et al. | 92/63 |

* cited by examiner

Primary Examiner—Lynne H. Browne
Assistant Examiner—John R. Cottingham
(74) Attorney, Agent, or Firm—Howard & Howard

(57) ABSTRACT

A brake actuator having an improved push rod and end plate assembly which eliminates the requirement for thread adhesive and avoids deformation of the exterior surface of the push rod. The push rod includes an axial internally threaded bore through one end and the shank portion of the mounting screw includes an unthreaded intermediate portion adjacent the threaded end portion having a plurality of radial lobes which are turned into the internally threaded bore of the push rod securely retaining the end plate to the push rod under vibration loading and extreme temperature conditions. The radial lobes on the intermediate portion of the mounting screw each include an arcuate spiral lead surface and a flat generally radial following surface which requires only a relatively small torque to secure the end plate to the push rod, but a significantly larger torque to unthread the mounting screw from the push rod.

18 Claims, 2 Drawing Sheets

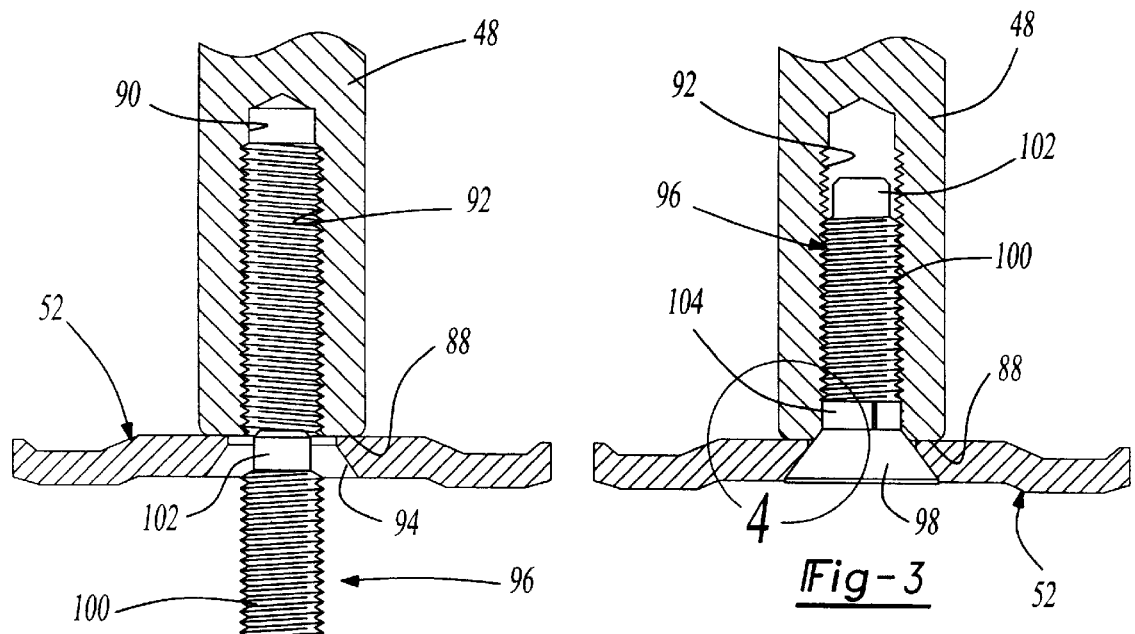
Fig-2
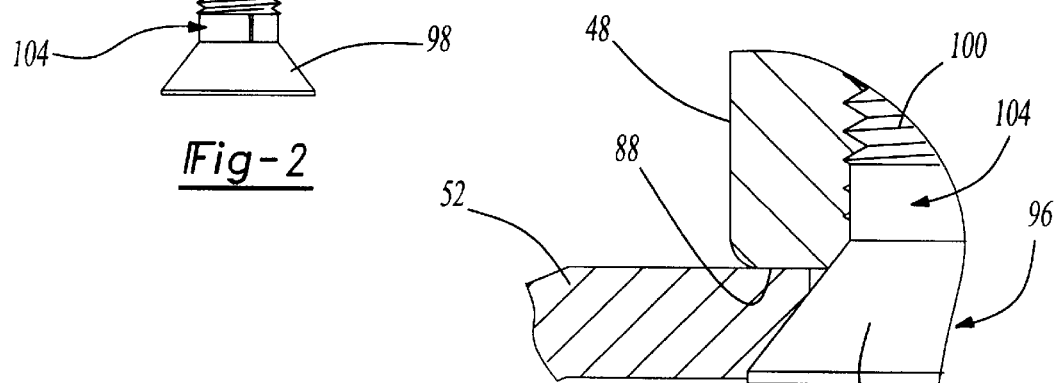
Fig-3
Fig-4
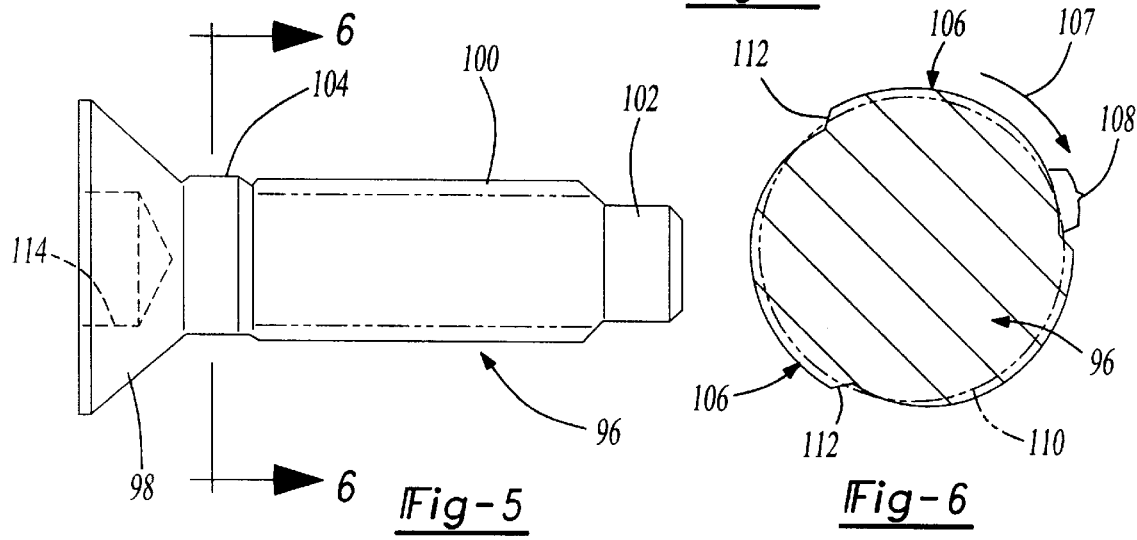
Fig-5   Fig-6

PUSH ROD AND PLATE ASSEMBLY FOR BRAKE ACTUATORS AND METHOD OF FORMING SAME

This invention relates to spring brake actuators of the type utilized to actuate the brakes of heavy vehicles. More particularly, the present invention relates to the push rod and plate assembly of such spring brake actuators and an improved method of securing the plate to the push rod which eliminates the requirement for a thread adhesive and reduces or eliminates deformation of the exterior surface of the push rod which may cause leakage.

BACKGROUND OF THE INVENTION

Pneumatic braking systems are commonly used on large commercial vehicles, such as trucks, trailers and buses. The considerable inertial mass of these heavy-duty vehicles in combination with the high speeds at which they travel requires a braking system which responds rapidly with substantial braking power. One system component of pneumatic braking systems is the spring brake actuator. The brake actuator provides the force necessary when braking the vehicle. There are several types of spring brake actuators including piston type spring brake actuators and diaphragm spring brakes. The service chamber of the spring brake actuator includes a housing defining a pneumatic chamber connected to the pneumatic system of the vehicle, a piston or push rod having a head or plate which reciprocates within the housing under pneumatic pressure and a return spring. In a diaphragm type spring brake actuator, a cup-shaped flexible diaphragm is supported within the chamber and the push rod plate is received against the diaphragm, such that one end of the push rod is driven through an opening in the housing when the pneumatic pressure flexes the diaphragm. A dual diaphragm spring brake actuator of the type disclosed herein includes an upper emergency chamber and a lower service chamber. The emergency chamber includes a power spring which is normally held in a compressed state by pneumatic pressure acting against the diaphragm in the upper chamber. When the pneumatic system of the vehicle fails or the parking brakes are applied, the power spring expands, driving the diaphragm and push rod in the upper chamber to brake the vehicle. The service chamber includes a second diaphragm and push rod assembly which actuates the braking system of the vehicle. Such spring brake actuators are well known in the art.

The push rod is normally secured to the end plate or end plates by a convention screw. The end plate includes an opening therethrough and the end of the push rod includes an internally threaded bore which receives the screw. However, there are several problems associated with the present method of attaching the end plate to the push rod. First, the connection between the push rod and the end plate must not loosen during use, particularly under the extreme temperature variations and vibration requirements. Second, the overall length of the push rod and plate assembly must be accurately controlled to the control the stroke of the push rod. Thus, the plate must be rigidly secured to the push rod. This is presently accomplished by using a thread adhesive such as Loctite® on the threads of the screw. As will be understood, however, applying a thread adhesive in a blind tapped hole cannot be fully controlled, particularly where the thread adhesive is applied by hand, and therefore at least some of the installations will fail. Further, non-destructive testing cannot assure that there will not be failures in the field. Finally, the exterior surface of the cylindrical push rod in the emergency chamber must be very accurately machined and coated with a hard protective coating to avoid leakage because of the pressure differential between the emergency and service chambers. A seal is provided between the emergency and service chambers and the push rod reciprocates through the seal. Therefore, any lack of concentricity or damage to the exterior surface of the push rod in the emergency chamber of a dual diaphragm spring brake actuator will result in leakage between the chambers. In the disclosed embodiment of the dual diaphragm spring brake actuator, an end plate is attached to both ends of the push rod. It is not therefore practical to forcefully grip the push rod of the emergency chamber during the connection of the end plates to the push rod which would cause deformation damage to the push rod and leakage between the chambers.

There is therefore a longstanding need to develop an effective method of attaching the end plate or end plates to the push rod of a spring brake actuator which assures a rigid permanent interconnection and which does not loosen during use. Further, a method of interconnecting the end plate to the push rod cannot result in damage to the push rod, particularly the push rod in the emergency chamber to avoid leakage between the emergency chamber and the service chamber. Finally, the method of attaching the end plate to a push rod cannot significantly increase the cost of the assembly. The improved brake actuator, particularly the improved push rod and plate assembly and method of attaching the end plate to a push rod of this invention accomplishes these objects.

SUMMARY OF THE INVENTION

As set forth above, this invention relates to a brake actuator having an improved push rod and plate assembly and a method of attaching an end plate to a push rod which assures a rigid and permanent assembly while avoiding any damage to the push rod. The brake actuator includes a housing which defines one or a pair of chambers, a push rod having an end plate which reciprocates within the housing and a return spring. In a diaphragm type spring brake actuator, a cup-shaped diaphragm is supported within the housing and the end plate of the push rod is biased against the midportion of the diaphragm. As set forth above, the push rod of an emergency chamber reciprocates through an annular seal.

The push rod and plate assembly includes a cylindrical push rod having a longitudinal axis, at least one end portion having an internally threaded bore, an end plate having an opening therethrough extending generally perpendicular to the longitudinal axis of the push rod and a screw having a threaded shank portion extending through the opening in the end plate and threadably received in the internally threaded bore of the push rod. The screw includes a head portion which retains the end plate to the push rod.

In the improved push rod and plate assembly of this invention, the shank portion of the screw adjacent the threaded portion includes a plurality of radial lobes each having a maximum circumferential diameter greater than the internal crest diameter of the threaded bore which deforms the crests of the threads of the internal bore, thereby securely retaining the end plate to the end portion of the push rod in flush relation and significantly increasing the torque required to unthread the screw. Stated another way, the circumferential diameter of the lobes is greater than the root diameter of the threaded shank portion. The longitudinal width of the lobes is preferably equal to one to seven threads of the threaded shank portion or more preferably two to five threads, such that the locking occurs only in threading the last few threads of the threaded shank in the threaded bore. Thread forming screws in an unthreaded bore has also been tried; however, thread forming screws require too much torque resulting in deformation or distortion of the push rod used in the emergency chamber of the brake actuator. As set forth above, the cylindrical push rod in the emergency chamber is accurately ground and preferably hard coated. An aluminum push rod is preferred to reduce weight. Further, an aluminum push rod in the emergency chamber is preferred to avoid rust which will interfere with and wear the seal between the emergency chamber and the service chamber. The most preferred embodiment of the push rod is an aluminum push rod having a hard zinc anodized coating. Alternatively, the push rod may be formed of steel having a hard rust resistant coating.

In the most preferred embodiment of the push rod and end plate assembly, the screw is designed such that the torque required to drive the lobular portion of the shank into the internal threaded bore of the push rod is significantly less than the torque required to unthread the mounting screw to assure a permanent connection and avoid damage to the push rod. As will be understood, the lobes on a screw have a leading surface defining a predetermined ramp angle and a following surface also defining a predetermined ramp angle. In the preferred embodiment of the mounting screw, the ramp angle of the following surfaces of the lobes is significantly greater than the ramp angle of the following surfaces. Further, in the preferred embodiment of the mounting screw in the push rod and end plate assembly of this invention, the intermediate portion has at least three adjacent or substantially contiguous radial lobes. In the most preferred embodiment, the ramp angle of the following surface of the lobes on the intermediate portion of the mounting screw are generally flat and extend at an angle greater than 40 to 60° to the surface of the adjacent lobe following surface. This provides a relatively sharp edge on the following surface of the lobes requiring a significantly greater torque to unthread the mounting screw from the threaded bore of the push rod, thereby assuring that the end plate is permanently mounted to the push rod. Further, the leading surfaces of the lobes preferably define a gradual arcuate surface reducing the torque required to thread the lobes into the threaded bore of the push rod, thereby reducing the likelihood of deformation or damage to the push rod. Where an aluminum push rod is used, the screw will be significantly harder than the push rod further reducing the torque required to drive the intermediate lobular portion into the threaded bore of the push rod, but also permitting removal of the mounting screw when required.

The brake actuator having an improved push rod and plate assembly of this invention therefore achieves the objects of this invention, including a permanent flush connection of the end plate to the push rod which will not loosen during use, avoids damage to the push rod during installation and the improvement is relatively inexpensive, particularly when compared to conventional methods including the use of a thread adhesive. The method of this invention thus comprises threading the mounting screw through the hole in the end plate into the internally threaded bore of the push rod and driving the intermediate lobular portion into the internally threaded bore, rigidly attaching the end plate to the push rod. Other advantages and meritorious features of the present invention will be more fully understood from the following description of the preferred embodiments, the appended claims and the drawings, a brief description of which follows.

DESCRIPTION OF THE DRAWINGS

FIG. 2 is an enlarged side partially cross-sectioned view of the push rod, end plate and mounting screw during installation of the mounting screw;

FIG. 3 is a side partially cross-sectioned view similar to FIG. 2 following installation of the mounting screw;

FIG. 4 is an enlarged view of FIG. 3;

FIG. 5 is a side view of the mounting bolt shown in FIGS. 2 to 4; and

FIG. 6 is an end cross-sectional view of FIG. 5 in the direction of view arrows 6—6.

BRIEF DESCRIPTION OF THE PREFERRED EMBODIMENTS

Figure 1:
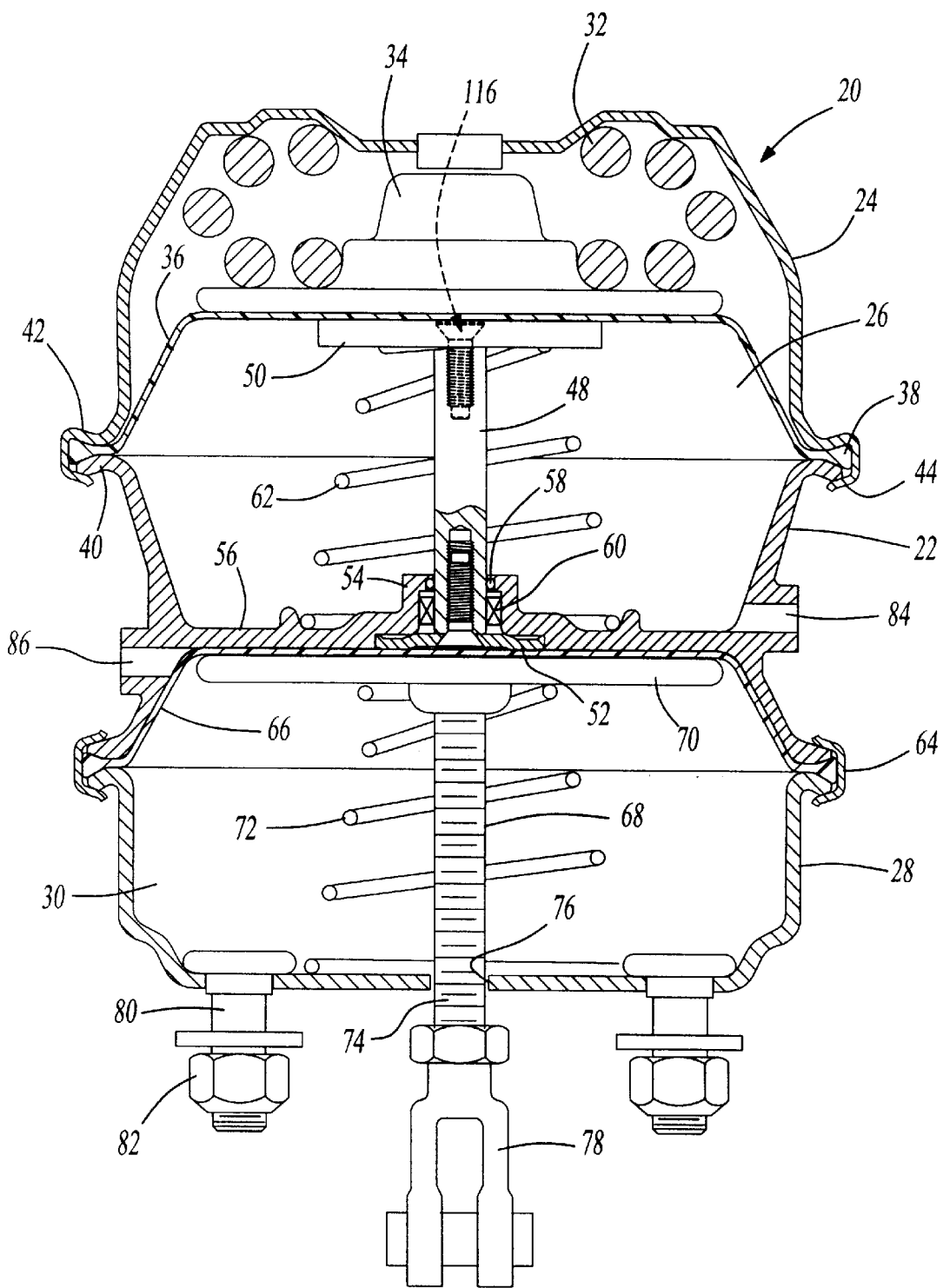
FIG. 1 is a side partially cross-sectioned view of a dual diaphragm spring brake actuator having the improved push rod and end plate assembly of this invention.

The housing of the dual diaphragm spring brake actuator 20 shown in FIG. 1 includes a central flange case 22, a head or cover 24, which in combination with the flange case defines an emergency chamber 26, and a service chamber housing 28, which in combination with the flange case defines a service chamber 30. The emergency chamber 26 includes a power spring 32 which reacts against a power spring piston 34, a cup-shaped diaphragm 36, a push rod 48 and a return spring 62. The flexible diaphragm 36 includes a radial rim portion 38 which is compressed between and retained by the radial flange portion 40 of the flange case and the radial flange portion 42 of the head. In the disclosed embodiment, the free end 44 of the emergency chamber cover is deformed beyond its elastic limit radially inwardly beneath the flange 40 of the flange case to permanently seal the emergency chamber as disclosed, for example, in U.S. Pat. No. 5,067,391 assigned to the assignee of the present application. The emergency chamber 26 further includes a push rod 48 having an upper end plate 50 and a lower end plate 52 attached to the push rod as described hereinbelow. The end of the push rod is received through an axial opening 58 in the boss 54 of the central web portion 56 of the flange case which includes an annual seal 60 as described further hereinbelow. The flange case 22, including the central web 56 and boss 54 may for example be formed of cast aluminum. The head 24 and service chamber housing 28 may be formed of steel. The emergency chamber further includes a return spring 62.

In the disclosed embodiment, the service chamber housing 28 is retained to the flange case by a conventional annular bolted clamp band 64. The service chamber includes a cup-shaped flexible diaphragm 66, a push rod 68 having an end plate 70 and a return spring 72. As described below, the free end portion 74 of the push rod 68 reciprocates through opening 76 of the service chamber housing 28 during normal operation of the brake actuator. The free end of the push rod in the disclosed embodiment includes a conventional yoke 78 which is attached to the braking system of the vehicle (not shown). The brake actuator is normally attached to the chassis of the vehicle by mounting bolts 80 and nuts 82. The flange case includes an emergency port 84 and a service chamber port 86.

The operation of the dual diaphragm spring brake actuator shown in FIG. 1 is well known and will therefore be described herein only briefly. In a conventional application, the emergency chamber port 84 is connected to the pneumatic system of the vehicle which is maintained at generally about 100 psi. This pressurizes the emergency chamber 26, flexing the diaphragm 36 to the position shown in FIG. 1. The pneumatic pressure in the emergency chamber 26 reacting against the diaphragm 36 compresses the piston 34 against the power spring 32 as shown. However, when the pressure in the emergency chamber 26 falls below a predetermined pressure or the vehicle is turned off, the power spring 32 expands against the piston 34 and diaphragm 36, driving the push rod 48 through opening 58 in boss 54. The lower end plate 52 then reacts against the service chamber diaphragm 66, driving the end plate 70 downwardly in FIG. 1, driving the end portion of the push rod 74 and yoke 78 downwardly, actuating the brakes of the vehicle. Thus, the components of the emergency chamber serve as an emergency braking system for the vehicle and a parking brake.

During normal braking operation, the service chamber port 86 is pressurized by operation of the brake pedal which causes the diaphragm 66 in the service chamber 30 to flex downwardly in FIG. 1, driving the end plate 70 and the push rod 68 downwardly, braking the vehicle. Thus, in an emergency situation or where the vehicle is turned off, the push rods 48 and 68, which are coaxially aligned, are driven downwardly in FIG. 1 to brake the vehicle. In normal braking operation, the emergency chamber 26 remains pressurized and only the push rod 68 in the service chamber is driven downwardly in FIG. 1 to brake the vehicle.

As will now be understood, however, the push rods 78 and 68 play a key role in the normal and emergency braking of the vehicle. Further, because of the normal pressure differential between the emergency chamber 26 and the service chamber 30, it is very important to prevent leakage between these chambers. This is accomplished by accurately grinding the cylindrical push rod 48 which seals against the annular resilient seal 60 in the opening 58 of the boss 54 during reciprocal movement of the push rod 48 as described above. The annular seal 60 may be formed of natural or synthetic rubber or various polymers. In the most preferred embodiment of the push rod and end plate plate assembly of this invention, the push rod 48 is formed of aluminum to avoid rust and reduce the weight of the push rod and the exterior surface includes a hard zinc anodized coating. Alternatively, the push rod may be formed of steel, but preferably includes a hard rust resistant coating as described above.

As described above, the end plates 50 and 52 are conventionally attached to the push rod 48 by a mounting screw using a thread adhesive such as Loctite® to prevent unthreading of the mounting screw during operation of the brake actuator. However, this method of attachment has not been fully effective because the mounting screws are received in blind tapped bores in the ends of the push rod 48, resulting in failures in the field. The end plate 70 is similarly attached to the push rod 68 by a mounting screw using a thread adhesive. The present invention relates to an improved method of attaching the end plates to the push rods which avoids deformation or damage to the exterior surface of the push rod while preventing unthreading of the mounting screws during normal usage. The improved connection between the push rods and the end plates will now be described in regard to the connection of the end plate 52 to the push rod 48. However, it will be understood that this same connection may be utilized in the connection of the upper end plate 50 to the push rod 48 in the emergency chamber 26 and the push rod 48 to the end plate 70 of the service chamber 30. FIGS. 2 to 6 illustrate a preferred embodiment of the attachment of the end plate 52 to the push rod 48 in the emergency chamber as described below. Further, as described above, the push rod may be attached to the end plate or end plates of a piston type spring brake actuator in a similar manner.

As shown in FIG. 2, the push rod 48 of the emergency chamber includes an end portion 88 having an axial bore 90 which is internally threaded as shown at 92 with a conventional internal machine thread. The end plate 52 includes an opening 94 which receives the mounting screw 96. As will be understood, the shape of the opening will depend upon the configuration of the head 98 of the mounting screw. In the disclosed embodiment, the head 98 is conical and thus the opening 94 is similarly conical. If, however, the head 94 of the mounting screw is hexagonal, for example, the opening 94 should be cylindrical such that the head 98 is received against the end plate 52. The end plate 52 is also configured to distribute the load on the end plate 70 of the service chamber when the power spring 32 expands. The mounting bolt 96 includes an externally threaded shank portion 100 and the threads are preferably machine screw threads to provide an accurate threaded connection with the internal machine threads 92 in the end 88 of the push rod 48. The mounting screw may also include a conventional dog point 102 to improve retention. As described below, the unthreaded intermediate shank portion 104 between the externally threaded portion 100 and the head 98 includes a plurality of radial lobes 106 which provide several important advantages in the push rod and end plate assembly of this invention as described.

FIG. 6 illustrates a preferred configuration of the radial lobes 106 on the intermediate shank portion 104. As shown, the lead surfaces 108 of the lobes defines a general arcuate spiral slope or ramp angle which actually begins radially inwardly from the crest 110 of the adjacent threaded portion 100. The following surfaces 112 of the lobes, however, define a relatively steep ramp angle including a relatively sharp edge where the following surface joins the outer surface of the lobes. The ramp angle of the following surface is preferably greater than 40 degrees or more preferably 40 to 80 degrees relative to the lead surface of the next adjacent lobe. As used herein, the lead surface 108 of the lobes 106 refers to the leading surface of the lobes as the mounting screw is threaded into the bore as shown by arrow 107. Further, the longitudinal width of the unthreaded intermediate shank portion 104 is relatively narrow particularly when compared to the length of the threaded shank portion 100. In the preferred embodiment of the mounting screw 96, the longitudinal width of the unthreaded lobular intermediate portion 104 is between 1 and 7 threads of the threaded shank portion 100 or more preferably between 2 and 5 threads, such that the mounting screw 96 locks in the threaded bore 92 of the push rod only in the last few threads.

FIGS. 3 and 4 illustrate the mounting screw 96 mounted in the threaded bore 92 of the push rod. The method of attaching the end plate 52 to the push rod 48 of this invention then includes disposing the mounting screw 96 through the opening 94 of the end plate, then threading the threaded portion 100 of the mounting screw into the internally threaded bore 92 of the push rod. Finally, as the mounting screw is threaded into the internally threaded bore 92 of the push rod, the intermediate unthreaded lobular portion 104 is turned into the threaded opening to the threaded bore 92 deforming the last few threads adjacent the bore opening as shown in FIG. 4. Because the ramp angle of the leading surfaces 108 are arcuate and relatively gentle as shown in FIG. 6, the torque required to drive the intermediate unthreaded lobular portion 104 into the threaded bore 92 is relatively small. However, because the ramp angles of the following surfaces 112 of the lobes 106 are relatively steep and include a sharp edge, a significant torque is required to unthread the mounting screw from the threaded bore, providing a very secure connection. However, as described above, where the push rod 48 is formed of aluminum having a hardness significantly less than the hardness of the mounting bolt 96, the mounting bolt can still be unthreaded, if required. The mounting screw may thus be threaded into the internally threaded bore 92 of the push rod without deformation or damage to the push rod, which is particularly important in push rod 48 in the emergency chamber as described above.

In the disclosed embodiment of the mounting screw 96, the head portion 98 includes an Allen wrench opening to receive a conventional Allen wrench. However, a blade, six-internal lobe (Torx) Phillips head opening may also be provided. As described above, the end plate 50 may be attached to the opposite end of the push rod 48 by a mounting screw 116 which may be identical to the mounting screw 96 described above. However, in certain applications, a mounting screw as described having a hexagonal head may be preferred as disclosed in U.S. Pat. No. 5,507,217 assigned to the assignee of the present application. Finally, the end plate 70 may be attached to the push rod 68 by a similar mounting screw.

Having described the improved push rod and plate assembly for brake actuators and method of forming same of this invention, it will be understood by those skilled in the art that various modifications may be made to the invention within the purview of the appended claims. For example, as described above, the head portion 98 of the mounting screw may be hexagonal or any conventional shape. Further, the push rods 48 and 68 may be formed of steel preferably having a rust resistant hard coating. Finally, the type and configuration of the brake actuator will depend upon the particular application and includes piston type brake actuators or the like. Having described the improved push rod and plate assembly for brake actuators and method of this invention, we now claim the invention, as follows.

What is claimed is:

1. A push rod and plate assembly for a brake actuator, comprising:

a cylindrical push rod having a longitudinal axis, an end portion and an internally threaded bore having a crest diameter and a root diameter extending through said end portion generally coaxially aligned with said longitudinal axis, an end plate having an opening therethrough overlying said end portion extending generally perpendicular to said longitudinal axis of said push rod; and a screw retaining said end plate to said push rod having a threaded shank portion threadably received through said opening in said end plate and in said internally threaded bore of said push rod, a head portion overlying said end plate and said shank portion having an unthreaded intermediate portion adjacent said threaded shank portion received in said internally threaded bore having a plurality of radial lobes, each of said lobes having a maximum circumferential diameter greater than the internal crest diameter of said internally threaded bore deforming a plurality of said crests of said internally threaded bore and securely retaining said end plate to said end portion of said push rod in rigid flush relation and significantly increasing the torque required to unthread said screw from said internally threaded bore of said push rod.

2. The push rod and plate assembly for a brake actuator as defined in claim 1, wherein said screw intermediate portion of said shank portion has at least three radial lobes, each radial lobe having a leading surface defining a ramp angle and a following surface defining a ramp angle, said following surfaces having a greater ramp angle greater than said ramp angle on said leading surfaces.

3. The push rod and plate assembly for a brake actuator as defined in claim 2, wherein said following surfaces of said lobes are generally flat extending at an angle greater than 60 degrees relative to the surface of the adjacent radial lobe following surface.

4. The push rod and plate assembly for a brake actuator as defined in claim 1, wherein the longitudinal width of said radial lobes on said intermediate portion of said screw is equal to the longitudinal width of one to seven threads of said threaded shank portion.

5. The push rod and plate assembly for a brake actuator as defined in claim 1, wherein the longitudinal width of said radial lobes on said intermediate portion of said screw is equal to the longitudinal width of two to five threads on said threaded shank portion.

6. The push rod and plate assembly for a brake actuator as defined in claim 1, wherein said screw is formed of a harder metal than said push rod.

7. The push rod and plate assembly for a brake actuator as defined in claim 6, wherein said cylindrical push rod is formed of aluminum having a hard anodized exterior coating.

8. The push rod and plate assembly for a brake actuator as defined in claim 6, wherein said cylindrical push rod is formed of steel having a rust resistant hard coating.

9. A brake actuator comprising a housing defining a chamber therein, a plate having an opening therethrough, a cylindrical push rod having a longitudinal axis, a first end portion having an internally threaded bore and a second end portion extending through an opening in said housing, and a mounting screw having an externally threaded shank portion extending through said opening in said plate and threadably received in said internally threaded bore of said push rod, a head portion overlying said plate and said shank portion having an unthreaded intermediate portion adjacent said threaded shank portion received in said internally threaded bore of said push rod having a plurality of radial lobes, each of said lobes having a maximum circumferential diameter greater than an internal crest diameter of said internally threaded bore in said push rod deforming said crests of said internally threaded bore and securely retaining said plate to said first end portion of said push rod in flush relation and significantly increasing the torque required to unthread said screw.

10. The brake actuator defined in claim 9, wherein said screw intermediate portion has at least three radial lobes, each lobe having a leading surface defining a ramp angle as said threaded shank is threaded into said internally threaded bore of said push rod and an opposed following surface defining a ramp angle and wherein said ramp angle of said following surface is greater than the ramp angle of said leading surface.

11. The brake actuator defined in claim 10, wherein said following surface is generally flat extending at an angle of greater than 40 degrees relative to the surface of the adjacent following surface.

12. The brake actuator defined in claim 9, wherein said opening in said housing includes an annular sealing member surrounding and closely receiving said cylindrical push rod and said push rod is formed of aluminum having a hard anodized coating.

13. The brake actuator defined in claim 9, wherein said opening in said housing includes an annular sealing member surrounding and closely receiving said push rod and said push rod is formed of steel having a rust resistant hard coating.

14. The brake actuator defined in claim 9, wherein said radial lobes on said intermediate shank portion of said screw have a longitudinal width equal to the longitudinal width of one to seven threads on said threaded shank portion.

15. The brake actuator as defined in claim 9, wherein said radial lobes on said unthreaded shank portion of said screw have a longitudinal width equal to the longitudinal width of two to five threads on said threaded shank portion of said screw.

16. A method of attaching an end plate to a push rod of a brake actuator, said push rod having a longitudinal axis, an end portion and an internally threaded bore extending through said end portion generally coaxially aligned with said longitudinal axis, and said end plate having an opening therethrough, said method comprising:

receiving a screw through said opening in said end plate having an externally threaded shank portion, a head portion and an unthreaded intermediate portion adjacent said externally threaded shank portion having a plurality of radial lobes each having a maximum radial dimension generally equal to or greater than the crest diameter of said threaded shank portion;

threading said shank portion of said screw into said internally threaded bore of said push rod; and continuing to thread said threaded shank portion of said screw into said internally threaded bore of said push rod, driving said intermediate portion into said threaded bore and said head portion of said screw against said end plate, said radial lobes on said intermediate portion of said screw deforming said internally threaded bore of said push rod, thereby locking said plate to said push rod and forming a rigid assembly.

17. The method of attaching a push rod to an end plate of a brake actuator as defined in claim 16, wherein said lobes on said intermediate portion of said screw each have a relatively smooth arcuate leading surface defining a ramp angle as said shank portion is threaded into said threaded bore of said push rod and an opposed following surface having a greater ramp angle than said ramp angle of said leading surface, said method including driving said lobes of said intermediate surface into said threaded bore of said push rod and said following surfaces of said lobe substantially increasing the torque required to unthread said screw from said threaded bore of said push rod.

18. The method of attaching a push rod to an end plate of a brake actuator as defined in claim 16, wherein said method includes forming said push rod of aluminum and coating the exterior surface of said cylindrical push rod with a hard anodized coating.

* * * * *